(12) United States Patent
Patel et al.

(10) Patent No.: US 12,381,956 B2
(45) Date of Patent: Aug. 5, 2025

(54) LOANING DATA CONNECTION CAPABILITIES FOR EDGE DEVICES

(71) Applicant: INTERNATIONAL BUSINESS MACHINES CORPORATION, Armonk, NY (US)

(72) Inventors: Kushal S. Patel, Pune (IN); Gandhi Sivakumar, Mountain View, CA (US); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 18/477,989

(22) Filed: Sep. 29, 2023

(65) Prior Publication Data

US 2025/0112974 A1 Apr. 3, 2025

(51) Int. Cl.
*H04L 67/141* (2022.01)
*H04L 41/50* (2022.01)

(52) U.S. Cl.
CPC ............ *H04L 67/141* (2013.01); *H04L 41/50* (2013.01)

(58) Field of Classification Search
CPC ..... H04L 67/141; H04L 41/50; H04L 47/781; H04L 47/70; H04L 47/83
See application file for complete search history.

(56) References Cited

U.S. PATENT DOCUMENTS

| | | | |
|---|---|---|---|
| 10,747,441 B2 | 8/2020 | Jean | |
| 2002/0156897 A1 | 10/2002 | Chintalapati et al. | |
| 2004/0136403 A1 | 7/2004 | Kekki | |
| 2009/0080438 A1* | 3/2009 | Zhou | H04L 12/4641 370/395.53 |
| 2011/0258318 A1 | 10/2011 | Peng | |
| 2011/0320722 A1* | 12/2011 | Dunn Berger | G06F 12/0855 711/E12.017 |
| 2012/0137021 A1* | 5/2012 | Chiueh | H04L 47/125 709/241 |
| 2013/0232274 A1* | 9/2013 | Johansson | H04M 15/62 709/228 |
| 2018/0139726 A1* | 5/2018 | Choi | H04L 67/1082 |
| 2021/0011765 A1* | 1/2021 | Doshi | G06F 9/5077 |
| 2021/0211392 A1* | 7/2021 | Thoppil | H04L 47/788 |
| 2022/0141151 A1* | 5/2022 | He | H04L 67/1008 709/226 |
| 2023/0275847 A1* | 8/2023 | Seibel | H04L 47/80 709/226 |

FOREIGN PATENT DOCUMENTS

CN 111800757 A 10/2020

OTHER PUBLICATIONS

R.L. Gomes, et al., "Software-Defined Management of Edge as a Service Networks," IEEE, Mar. 7, 2016, 14 pp.

* cited by examiner

*Primary Examiner* — Johnny B Aguiar
(74) *Attorney, Agent, or Firm* — KONRAD, RAYNES, DAVDA & VICTOR LLP; Rabindranath Dutta

(57) ABSTRACT

Provided are a method, system, and computer program product in which a connection management system is provided in multi-site target system. Resources for connections not needed at a point in time are loaned, from one entity to another in the connection management system.

14 Claims, 9 Drawing Sheets

┌─ 300
| Multipathing when disk is available via 4 paths (sessions)
|
| ┌─ 302
| mpatha (36005076802850bd97000000000000000) dm-3 IBM,2145 >> Contributing QD = 16
| size=33T features='1 queue_if_no_path' hwhandler='1 alua' wp=rw
| |+ policy='service-time 0' prio=10 status=enabled
| | |- 4:0:1:0 sdd 8:48 active ready running    >>>> Session Queue depth= 4 >> Site1
| | `- 6:0:0:0 sdc 8:32 active ready running    >>>> Session Queue depth= 4 >> Site1
| `+ policy='service-time 0' prio=50 status=active
|   `- 7:0:1:0 sdb 8:16 active ready running    >>>> Session Queue depth= 4 >> Site2
|   `- 7:0:1:0 sda 8:17 active ready running    >>>> Session Queue depth= 4 >> Site2

Sessions to host to site map generation

| Host | Site | SID | QD |
|---|---|---|---|
| Host1 | S1 | 0x00007f3d7006a0d8 | 4 |
| Host2 | S2 | 0x00007f3d7006a0d9 | 1 |
| Host3 | S1 | 0x00007f3d7006a0e0 | 4 |
| Host4 | S1 | 0x00007f3d7006a0e1 | 4 |
| Host1 | S2 | 0x00007f3d7006a0e2 | 1 |
| Host2 | S1 | 0x00007f3d7006a0e3 | 4 |
| Host3 | S2 | 0x00007f3d7006a0e4 | 1 |
| Host4 | S2 | 0x00007f3d7006a0e5 | 1 |

Loaning of CDM buffer to increase a session's queue depth

| Host1 - Site1 | Host2 - Site2 |
|---|---|
| Connection_CONN 1<br>→ Active Optimized (S1, QD=4)<br>Connection_CONN 2<br>→ Failed (S1, QD=4)<br>Connection_CONN 3<br>→ Active Non-Optimized (S2, QD=4)<br>Connection_CONN 4<br>→ Active Non-Optimized (S2, QD=4) | Connection_CONN 1<br>→ Active Non-Optimized (S1, QD=4)<br>Connection_CONN 2<br>→ Failed (S1, QD=4)<br>Connection_CONN 3<br>→ Active Optimized (S1, QD=4)<br>Connection_CONN 4<br>→ Active Non-Optimized (S1, QD=4) |

| Host1 - Site1 | Host2 - Site2 |
|---|---|
| Connection_CONN 1<br>→ Active Optimized (S1, QD=4)<br>Connection_CONN 2<br>→ Failed (S1, QD=4)<br>Connection_CONN 3<br>→ Active Non-Optimized<br>(S2, QD=1)<br>Connection_CONN 4<br>→ Active Non-Optimized<br>(S2, QD=1) | Connection_CONN 1<br>→ Active Non-Optimized<br>(S1, QD=1)<br>Connection_CONN 2<br>→ Failed (S1, QD=1)<br>Connection_CONN 3<br>→ Active Optimized (S1, QD=4)<br>Connection_CONN 4<br>→ Active Non-Optimized<br>(S1, QD=4) |

Queue depth reduction and reallocation to DR connections during failover

FIG. 7

LOANING DATA CONNECTION CAPABILITIES FOR EDGE DEVICES

BACKGROUND

Embodiments relate to a method, system, and computer program product for loaning data connection capabilities for edge devices.

Cloud computing and cloud storage have become the preferred mechanism for delivering information and online functionality. While some cloud services focus on providing consumers with a broad range of services and functionalities, including online shopping, research, social media networking, entertainment consumption and protection of important digital documents, other cloud services focus on small businesses, large enterprises, governments and other institutions. Various cloud services provide cloud storage and processing capability to consumers at no charge, while others charge some type of subscription-based fee. There are also private clouds that are owned and controlled by an organization, providing a secure network for sharing critical software and data. For example, hospitals may choose to use public archiving services for electronic medical records and patient image data, or they can create their own cloud archiving solution.

Software as services cloud solutions may include file, document, music, photo and video sharing, backup and restore solutions, archiving capabilities, etc. Other cloud computing options include databases, big data analytics, cloud drives and other applications exploiting back-end cloud storage. The cloud solutions may also extend to products and solutions used for deploying public, private and hybrid clouds.

Storage controllers may be used in the cloud to allow hosts to access storage devices controlled by the storage controllers.

SUMMARY

Provided are a method, system, and computer program product in which a connection management system is provided in multi-site target system. Resources for connections not needed at a point in time are loaned, from one entity to another in the connection management system.

In additional embodiments the multi-site target system is in a core or edge. A storage management instance of a cloud locates hosts for their site preferences and volume attachments to them, locates connections created from individual site to target object identifier instances and creates a map of mutual exclusion of connections for the hosts which are on differential sites for host objects. Based on the map of connections for the hosts, the multi-site target system further locates those connections that can loan the resources to each other to generate a superior equilibrium and collaboration between the hosts of the multi-site target system to improve resource utilization.

In further embodiments, an initiator controller is initiated to load metadata, session information, target details. Operations are performed for loading data for session authentication and target connectivity details. A data structure is initiated to be used to maintain a queue depth enumerator.

In additional embodiments, a process is initialized and loads metadata from a cluster state machine, wherein: the process gathers data for site information for nodes and host object policies; mapping of an initiator identifier and site preferences are created and saved in a local data structure; a state change notification (SCN) or registered state change notification (RSCN) is polled to make changes in the local data structure and site preferences; and information about volume host objects and their site preferences is in a metadata mapper class that is used to allocate queue depth.

In yet additional embodiments, a process validates a topology for the multi-site target system for site awareness policies, wherein: workload expectations are determined based on the topology; and the process collects data for topologies and activates connection rules accordingly.

In certain embodiments, a target process initiates data collection from data structures about host objects, host to volume mapped, session count, wherein: a deeper level of traversal is performed to locate the sessions and connections created for every object if they are created already; and the sessions to host to site map is generated which have an understanding about sessions.

In further embodiments, a process locates resources which are used in a mutually exclusive way, and wherein if a first site's hosts are not using selected command buffers, then the process locates those hosts to which these selected command buffers can be loaned to increase a session's queue depth.

BRIEF DESCRIPTION OF THE DRAWINGS

Referring now to the drawings in which like reference numbers represent corresponding parts throughout:

FIG. 3 illustrates a block diagram that shows multipathing, in accordance with certain embodiments.

FIG. 4 illustrates a block diagram that shows sessions to host to site map generation, in accordance with certain embodiments.

FIG. 5 illustrates a block diagram that shows the loaning of command (CMD) buffers, in accordance with certain embodiments.

FIG. 7 illustrates a block diagram that shows queue depth reduction and reallocation of drive (DR) connections during failover, in accordance with certain embodiments.

DETAILED DESCRIPTION

Figure 1:
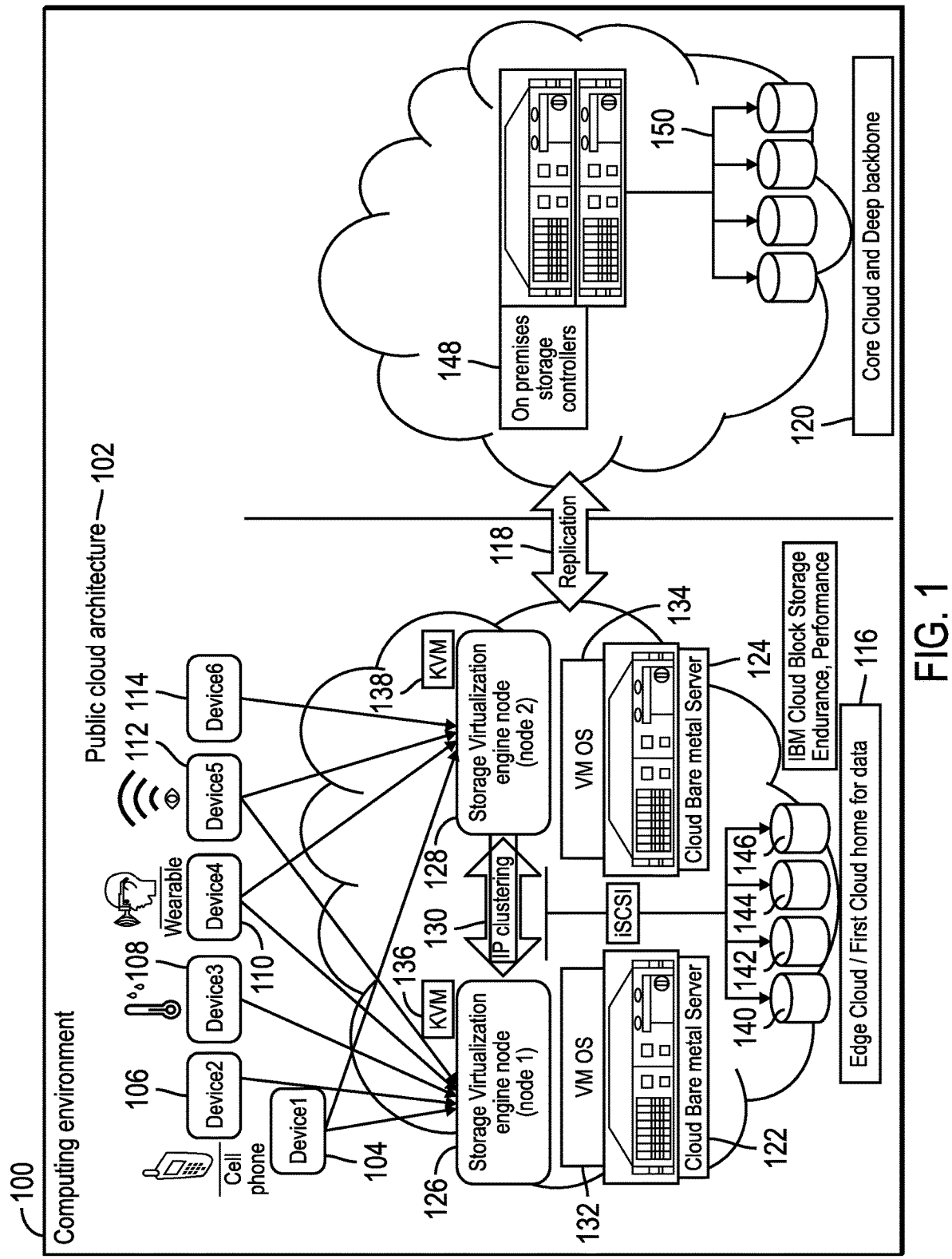
FIG. 1 illustrates a block diagram of a computing environment, in accordance with certain embodiments.

In the following description, reference is made to the accompanying drawings which form a part hereof and which illustrate several embodiments. It is understood that other embodiments may be utilized, and structural and operational changes may be made.

Example 1: A method in which a connection management system is provided in multi-site target system. Resources for connections not needed at a point in time are loaned, from one entity to another in the connection management system. As a result, connection management capabilities are improved in a computer system, in comparison to prior art.

Example 2: The limitations of any of Examples 1 and 3-7, wherein in additional embodiments the multi-site target system is in a core or edge. A storage management instance of a cloud locates hosts for their site preferences and volume attachments to them, locates connections created from individual site to target object identifier instances and creates a map of mutual exclusion of connections for the hosts which are on differential sites for host objects. Based on the map of connections for the hosts, the multi-site target system further locates those connections that can loan the resources to each other to generate a superior equilibrium and collaboration between the hosts of the multi-site target system to improve resource utilization. As a result, improved mechanisms for connection loaning are performed in a computer system, in comparison to prior art.

Example 3: The limitations of any of Examples 1-2 and 4-7, wherein in further embodiments, an initiator controller is initiated to load metadata, session information, target details. Operations are performed for loading data for session authentication and target connectivity details. A data structure is initiated to be used to maintain a queue depth enumerator. As a result, session authentication is performed during improved connection management, in comparison to prior art.

Example 4: The limitations of any of Examples 1-3 and 5-7, wherein in additional embodiments, a process is initialized and loads metadata from a cluster state machine, wherein: the process gathers data for site information for nodes and host object policies; mapping of an initiator identifier and site preferences are created and saved in a local data structure; a state change notification (SCN) or registered state change notification (RSCN) is polled to make changes in the local data structure and site preferences; and information about volume host objects and their site preferences is in a metadata mapper class that is used to allocate queue depth. As a result, queue depths are allocated during improved connection management, in comparison to prior art.

Example 5: The limitations of any of Examples 1-4 and 6-7, wherein in yet additional embodiments, a process validates a topology for the multi-site target system for site awareness policies, wherein: workload expectations are determined based on the topology; and the process collects data for topologies and activates connection rules accordingly. As a result, a topology is validated in an improved connection management system, in comparison to prior art.

Example 6: The limitations of any of Examples 1-5 and 7, wherein in certain embodiments, a target process initiates data collection for data structures about host objects, host to volume mapped, session count, wherein: a deeper level of traversal is performed to locate the sessions and connections created form every object if they are created already; and the sessions to host to site map is generated which have an understanding about sessions. As a result, a session to host to site map is generated to improve a connection management system, in comparison to prior art.

Example 7: The limitations of any of Examples 1-6, In further embodiments, a process locates resources which are used in a mutually exclusive way, and wherein if a first site's hosts are not using selected command buffers, then the process locates those hosts to which these selected command buffers can be loaned to increase a session's queue depth. As a result, an improved queue depth management system is created, in comparison to prior art.

Example 8: A system, comprising a memory, and a processor coupled to the memory, where the processor performs operations, the operations comprising performing a method according to any one of Examples 1-7. As a result, connection management capabilities are improved in a computer system, in comparison to prior art.

Example 8: A computer program product, the computer program product comprising a computer readable storage medium having computer readable program code embodied therewith, the computer readable program code when executed is configured to perform operations, the operations comprising performing a method according to any of Examples 1-7. As a result, connection management capabilities are improved in a computer system, in comparison to prior art.

FIG. 1 illustrates a block diagram of a computing environment 100, in accordance with certain embodiments. A public cloud architecture 102 in which the various elements of FIG. 1 are included is shown in FIG. 1. As a result, connection management capabilities are improved in a computer system.

There are many edge devices 104, 106, 108, 110, 112, 114 connected directly to the edge cloud 116 which is a first cloud home for data. The edge devices may include cell phones, wearable devices, temperature sensors, cameras, computers, audio and video devices, etc. The data may be replicated 118 to a core cloud 120 that may be referred to as a deep backbone for the data.

The edge devices 104, 106, 108, 110, 112, 114 may be coupled to servers 122, 124 (referred to as cloud bare metal servers in FIG. 1) where storage virtualization engine nodes 126, 128 are formed and Internet Protocol (IP) clustering 130 is performed. The virtual machines operating systems (VM OS) 132, 134 are shown as executing on the servers 122, 124. Exemplary keyboard, video, mouse (KVM) switches 136, 138 for connections are also shown in FIG. 1.

The servers 122, 124 may also be referred to as storage controllers that control access to storage devices 140, 142, 144, 146. Such storage controllers and storage devices may also be found in the core cloud and deep backbone 120 as shown via reference numeral 148, 150. The servers and storage controller may comprise any suitable computational devices known in the art. The storage devices may include any suitable storage device known in the art such as disk drives, tape drives, solid state drives, etc.

The edge devices use the edge cloud facilities for data transmission from edge collectors which are then further used for the computation of various types of results. It is common for edge sensors to keep generating data after regular time intervals and then send the data to edge cloud application instances where the data is processed. Another example could be the edge device which is computing the outcome and sending the data to the cloud backbone and the first place for data consumption is the edge cloud where the data is stored and then further managed depending on the policies.

The device makes the connection to the edge cloud service instance and sends the data. For data transmission from edge devices, Ethernet is one of the very popular and feasible option since it provides the flexibility as well as reliability for the processing. When the devices are using Ethernet for the connectivity option, generally the devices connect the target service in the edge via multiple paths. This allows a high availability network to be established between the service and the edge device.

Figure 2:
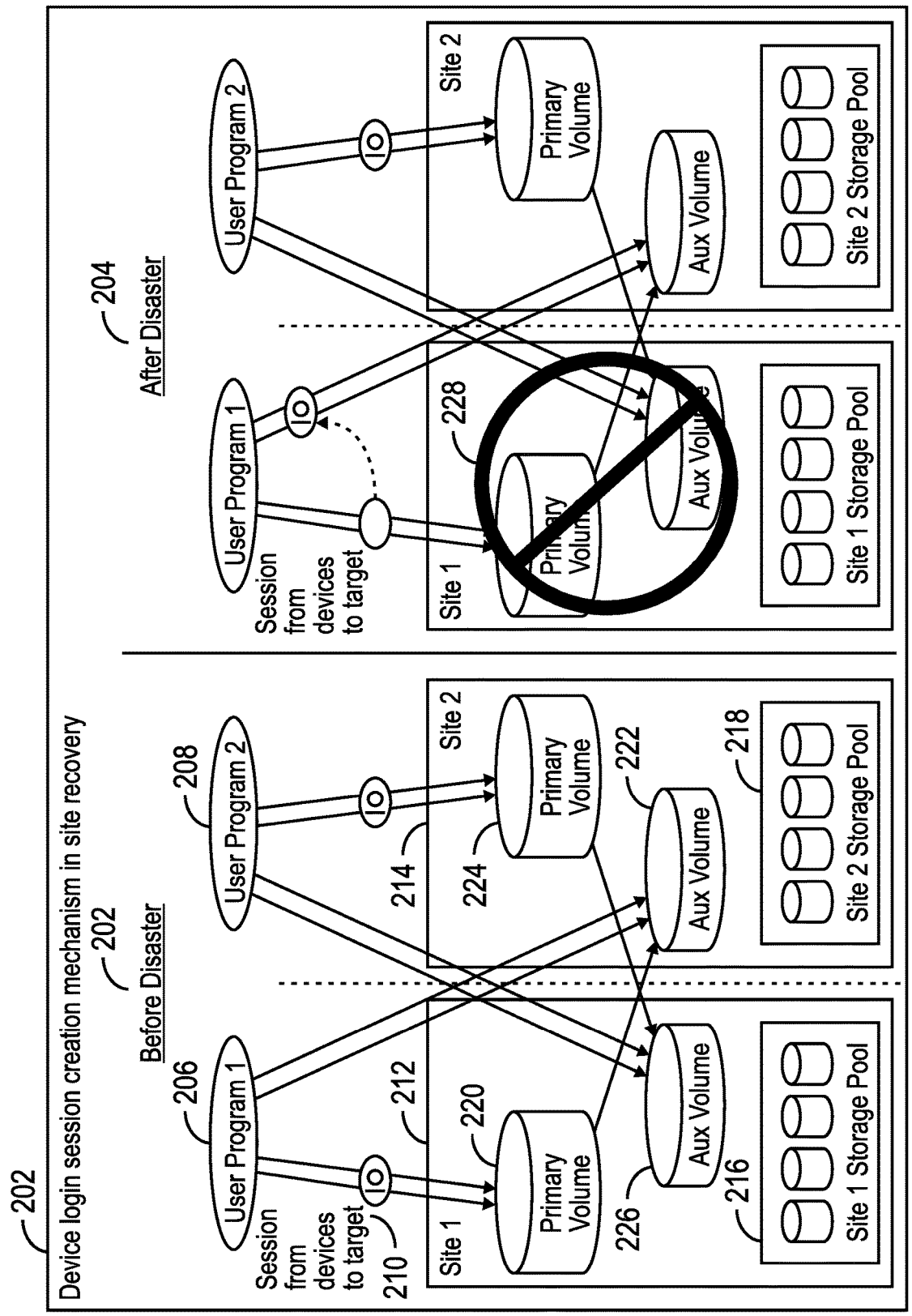
FIG. 2 illustrates a block diagram that shows a device login session creation mechanism, in accordance with certain embodiments.

FIG. 2 illustrates a block diagram that shows a device login session creation mechanism 200, in accordance with certain embodiments. Two scenarios are depicted—one prior to a disaster (reference numeral 202) and the other after a disaster (reference numeral 204).

Prior to a disaster a user program 1 206 and a user program 2 208 in a multi-site solution create sessions 210 from devices to targets at two different sites, site 1 212 and site 2 214, where site 1 212 provides access to the site 1 storage pool 216 and site 2 214 provides access to the site 2 storage pool 218.

User program 206 performs Input/Output (IO) with the primary volume of site 1 (shown via reference numeral 220) and also has connection to the auxiliary volume of site 2 (shown via reference numeral 222). User program 208 performs IO with the primary volume of site 2 (shown via reference numeral 224) and also has connection to the auxiliary volume 226 of site 1 212.

In case of such a multi-site solution, the paths on the primary site are the preferred path and they are used for all the active IO workload processing. However, for the high availability purpose, the devices also have paths to the secondary site which are idle during most of the lifetime of the system. These paths (to the secondary site) are activated only when the primary site detects a failure, which is a very rare occurrence.

Additionally, in a typical multi-site architecture, the system allows to create hosts and workload on both the sites at the same time. In such types of implementations, there will be some hosts or devices which are accessing the storage via site1 212 as primary while other set of devices will be using site2 214 as primary even when they have connections to both the sites for disaster recovery purpose. In such type of implementations, even if devices have created x sessions and connections to the target, they effectively use n/2 sessions for active workload purposes. Since the capabilities are bifurcated between number of connections present in the systems, this degrades the capability distribution per connection on the system which limits the overall performance. If the system is analyzed carefully, there are many connections which are operated in a mutually exclusive fashion and still consume individual resources on the systems that need better option to manage the system and this is described in this disclosure.

In addition to this, there are some initiator connections from edge devices which are not in use on continuous basis since they are generating the workload on the periodic cycle interval and sending the sender data to the target system for saving and processing it. In such cases, even if the initiator device needs the connection and resources for a certain duration during the day, it keeps consuming resources on the target side which includes Central Processing Unit (CPU) polling thread and the memory buffers which are allocated for assigning queue depth to the connection and are always occupied and cannot be released till the session is removed. In such cases even if the connection is not active, it is still consuming the resources which impacts performance of the system. There is no way today by which such conditions can be monitored closely, and connection resources can be shared in certain embodiments to get the better performance by utilizing the same resources between the connections by analyzing their primary and secondary location to leverage additional input command buffer and queue depth for the applications to boost the performance of the system and this is proposed in this disclosure.

In FIG. 2, the situation after a disaster is also shown via site 1 becoming non-operational (as shown via reference numeral 228). In such a case user program 1 and user program 2 perform IO with the volumes in site 2.

Certain embodiments provide a method, system and computer program product that will work on the connection management in multi-site target system in the core or edge cloud's storage management instance, and such method system locates the hosts and devices for their site preferences and volume attachment to them, locates the connections created from individual site to the target object identifier instance and creates the map of mutual exclusion of the connection which are on different sites for the host objects. Depending on the mutex map of the connections for the host, the system further locates the connections that can loan the resources to each other to generate better equilibrium and collaboration between the hosts of the system and for better utilization of resources. This improves the performance of computer systems.

In such multi-site systems with connections, the connection queue depth is of importance. Queue depth is the number of READ/WRITE IO requests [Small computer system interface (SCSI) commands] that can be queued at one time on a target system. Each IO command request from the initiator (host or application) to the target consumes a queue entry. Typically, a higher queue depth equates to better performance. However, if the target storage controller's maximum queue depth is reached, that target storage controller rejects all further incoming commands by returning a QFULL response to them. If a large number of applications (initiators) are accessing a target storage controller, careful planning is needed to avoid QFULL conditions that may significantly degrade system performance and can lead to errors on some systems.

In a configuration with multiple initiators (hosts), all hosts should have similar queue depths. Because of the inequality in queue depth between hosts connected to the storage controller through the same target port, hosts with smaller queue depths are deprived of access to resources by hosts with larger queue depths.

In case of Ethernet based connections between initiator and the target devices [e.g., over Internet SCSI (iSCSI) or Non-volatile memory express (NVMe) over Transmission Control Protocol (TCP) and other protocols], when the connection is established between initiator and target systems, the endpoints will negotiate on the queue depth and decision of queue depth depends on the negotiation finalization. This queue depth is designated per connection basis (per session queue depth allocation). Hosts (e.g., devices) generally create more than one session to target device to avail the benefits of high availability and disaster recovery features offered by the networking and target systems. For example, when one application has created 4 sessions between initiator and target to access remote volume via multiple network paths (to different target nodes of same controller), then in that case, the target system will allocate the X queue-depth to every session, and total queue depth count becomes 4× from which the target logical unit (LUN) can be accessed by the initiator system.

In embodiments in which a disk is accessible via 4 paths (sessions), an exemplary multipathing is shown in a block diagram 300 of FIG. 3, where exemplary code 302 for multipathing is shown, in accordance with certain embodiments. At different times different sessions are active with different queue depths for different sites as shown in FIG. 3.

The system comprises a process running in the target instance which could be an edge or core cloud situated instance, the process receiving the data from edge devices for storing and processing the same. The process collects the information about the host objects which are nothing but the initiator systems which are connected to send/receive the IO workload commands. This information will be collected from cluster CSM (cluster state machine), and their site preference will be inquired. Before that, the process validates for the topology for the target system for site awareness policies. There could be a system that expects the workload on both the sites at the same time and still allows multisite configuration. The process collects the data for the topologies and activates the connection rules accordingly. Once the data from hosts are collected, the system further goes to a deeper level to locate the sessions and connections created for every object if they are created already. In this way, the sessions to host to site map is generated which has the understanding about which are sessions, which are created from which site for what type of hosts. The polling thread was actuated from both the sites at the same time so that it collects the data from both the locations. The process further identifies the hosts for which the sessions are created on non-preferred site and performs the activity on both sites to understand which are the connections that are not required to consume the resources on normal operating mode.

For example, if there are 10 hosts having primary site as site1 and there are another 10 hosts created on the CSM which has primary site as site2. For simplicity let us take each of the initiators as 4 sessions to each node having queue depth of 16 allocated to them considering available target command (CMD) buffer. Then in that case, total CMD buffer utilized becomes 20*2=40(×16 each) per site, so it is 40 connections on site1 and 40 on site2 are active from which effectively only half of them are experiencing IO workload and other half are nearly idle. The system will then locate the resources which are used in a mutually exclusive way. In this example here, the Site1 hosts are not using CMD buffers from site and vice versa. The process then locates the hosts to which these CMD buffer can be loaned to increase the session's queue depth.

Additionally, the process further enquires the operating time from the initiator via in-band or out of band Application Program Interface (API) connections where initiator must respond for the time duration of the day wherein the connections are needed to be super active, and low workload expectation for other duration. This data is superimposed on the loaner and receiver statistics to match the hosts which have mutually exclusive access time for peak workload and then the command buffer pool can be leveraged in sharing mode for them. This will further improve the resource management at the target side and improve the performance of the system.

The loaner and receiver connections are mapped based on the mutex calculations and then the information is supplied to the connection manager. The connection manager has a polling thread that collects the data from the loaner receiver sides and triggers the queue depth change request from the target via initiating unit attention (UA) command. In response to that, if the initiator is ready to increase or decrease the queue depth, the queue depth will be changed for the connections considering theses are loaner depth that can be revoked during disaster situations to another site. Since the additional command queue depth is allocated to the connection, it will now be able to generate more workload and better application performance can be achieved.

The following are certain advantages of the embodiments:
(1) Consistent performance can be gained with better resource allocation at cloud infra initiator and target systems.
(2) Avoids packet drops at various networking entities and saves cloud's backbone network from congestion.
(3) Considers the digestive capability of host and application level to avoid retransmission and packet drops at application layer;
(4) Since the target command pool is utilized optimally and additional depth is available for resources for burst traffic, it will improve work performance dramatically with same amount of target resources;
(5) Avoids QFULL and command window closures and ensure seamless flow between endpins;
(6) Avoids latency glitches for application workload; and
(7) Easy to implement: These embodiments do not have any extraordinary hardware and software requirement and hence can be implemented easily with the current edge computing system architecture and serves real time problem solution for real time device data transfer.

Figure 6:
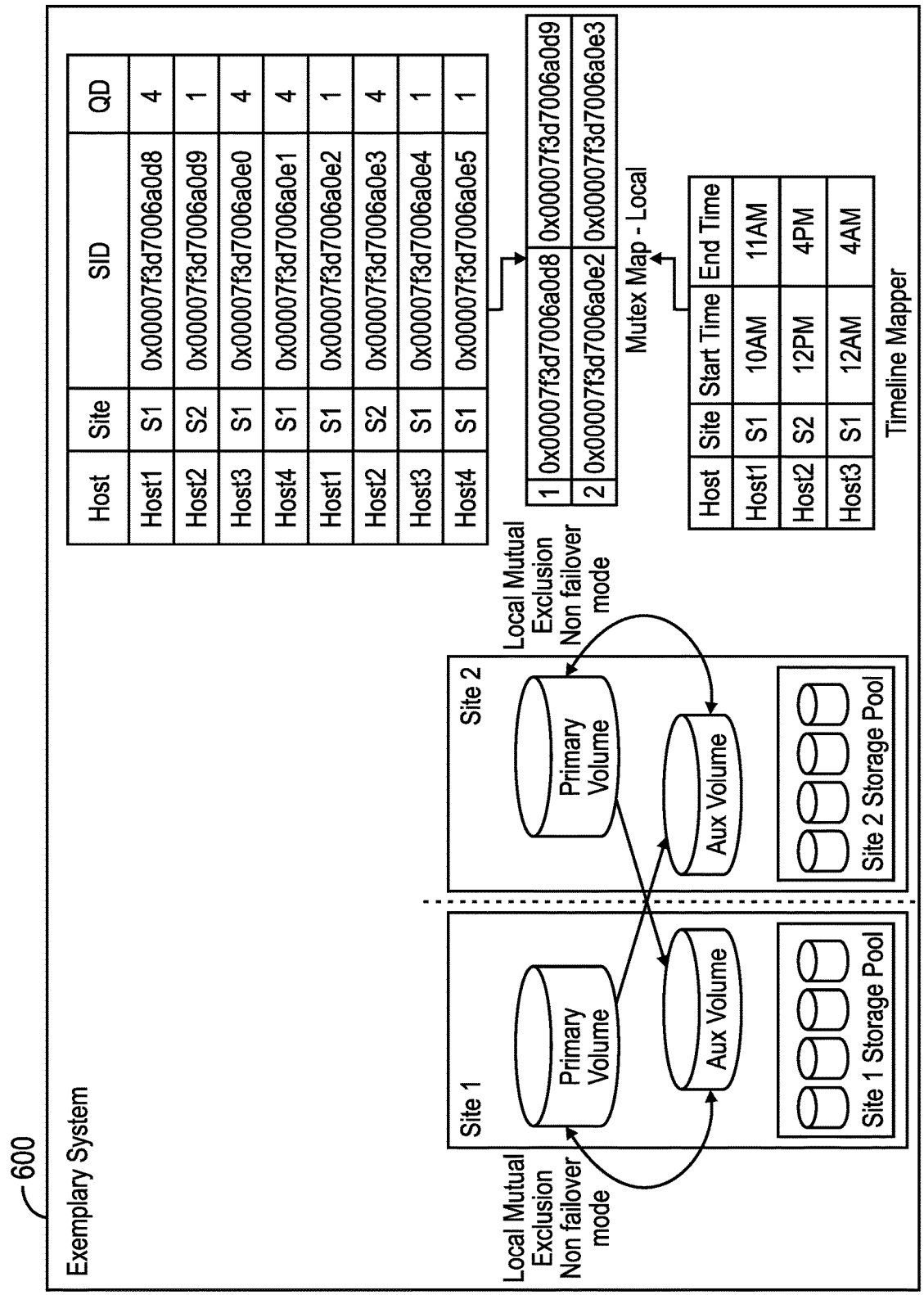
FIG. 6 illustrates a block diagram that shows an exemplary system, in accordance with certain embodiments.

The following are certain operations that may be performed in certain embodiments:
1. The process running in the initiator controller will initiate itself and load the metadata, session information, target details, etc.
   a. The process then loads the Challenge-Handshake Authentication Protocol (CHAP) data for session authentication and target connectivity details (CHAP is a type of authentication protocol).
   b. The process initializes the data structure which will be used to maintain the current and DR-queue depth enumerator, where DR-queue is the drive queue.
2. The process running in the target is initialized and loads the metadata from cluster state machine.
   a. The process gathers data for site information for the nodes and host object policies.
   b. Mapping of the initiator identifier and site preferences are created and saved in the local data structure.
   c. SCN/RSCN (i.e., state change notification, SCN, and registered state change notification, RSCN) will be polled to make the changes in the data structure and site preferences.
   d. The information about volumes host objects and their site preference is located in the metadata mapper classes which will be used to allocate queue depth from the target.
3. The process validates the topology for the target system for site awareness policies.
   a. The workload expectations are determined based on the topology.
   b. The process collects the data for the topologies and activates the connection rules accordingly.
4. The target process initiates data collection from CSM data structures, about the host objects, host to volume mapped, session count, etc.
   a. Then further go to the deeper level to locate the sessions and connections created from every object if they are created already.
   b. The sessions to host to site map is generated which has the understanding about which are sessions (as shown in FIG. 4 via reference numeral 400).
5. The polling thread is actuated from both the sites at the same time so that it collects the data from both the locations.
   a. The gathering collection is forked into multiple threads for each site.
   b. The process further identifies the hosts for which the sessions are created on non-preferred site and performs the activity on both sites.
   c. This will give understanding of which are the connections that are not required to consume the resources on normal operating mode.
6. The system will then locate the resources which are used in mutually exclusive way.
   a. For example, the Site1 hosts are not using CMD pool from site and vice versa. The process then locates the hosts to which these CMD buffer can be loaned to increase session's queue depth. [As shown in FIG. 5 via reference numeral 500].
7. The process further enquires the operating time from the initiator via in-band or out of band API connections.
   a. The process sends In-band or OO-Band Enquiry (ENQ) message to initiator for getting the super-active time.
   b. In response to that, the initiator will respond back with a response (RESP) having super-active time details where the connections are needed to be super active,
   c. The initiator also makes low workload expectation time requirement.
8. The super-activity data will be superimposed on the loaner and receiver stats to merge the hosts that have mutually exclusive access time for peak workload.
   a. The command buffer pool can be leveraged in sharing mode for the hosts with non-overlapped super-activity timelines.
9. The loaner and receiver connections are mapped based on the mutex calculations and then the information is supplied to the connection manager.
   a. The polling thread collects the data from the loaner receiver sides.
   b. The driver triggers the queue depth change request from the target via initiating unit attention (UA) command.
   c. In response to that, if the initiator is ready to increase, decrease the queue depth, the queue depth will be changed for the connections. [Details are shown in the exemplary system 600 of FIG. 6]
10. During DR trigger event,
    a. The driver sends UA back to the initiator for revoking additional resources.
    b. The initiator will understand the situation and reduce the queue depth and CMD buffer can be allocated to DR connections during failover. Details are shown in FIG. 7 (shown via reference numeral 700).

Figure 8:
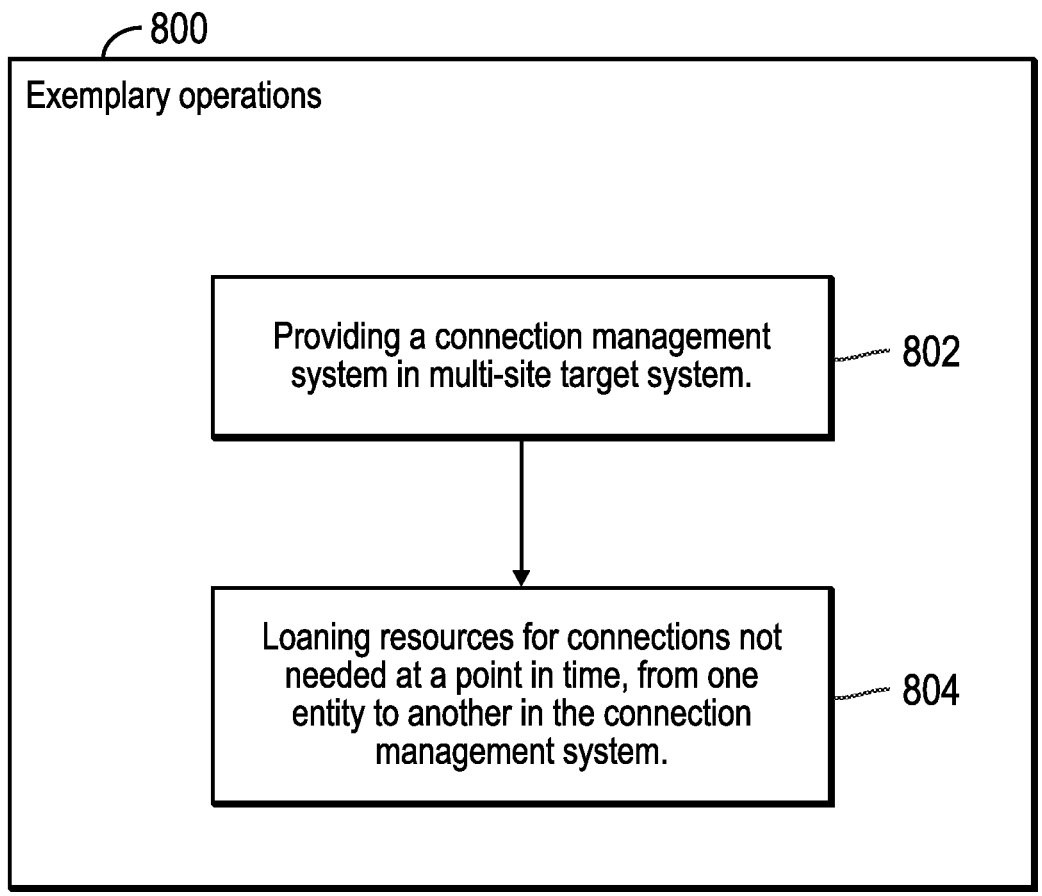
FIG. 8 illustrates a flowchart that shows exemplary operations, in accordance with certain embodiments.

FIG. 8 illustrates a flowchart 800 that shows exemplary operations, in accordance with certain embodiments.

Control starts at block 802 in which in which a connection management system is provided in multi-site target system. Resources for connections not needed at a point in time are loaned (at block 804), from one entity to another in the connection management system.

In further embodiments, the polling thread is actuated from both the sites at the same time so that it collects the data from both the locations, and wherein: the gathering collection is forked into multiple threads for each site; a process further identifies the hosts for which the sessions are created on non-preferred site and performs the activity on both sites; and the process gives understanding of which are the connections that are not required to consume the resources on normal operating mode.

In certain embodiments, a process further enquires the operating time from the initiator via in-band or out of band API connections, and wherein: the process sends In-band or OO-Band ENQ message to initiator for getting the super-active time; in response, the initiator will respond back with RESP having super-active time details where the connections are needed to be super active; and the initiator also makes low workload expectation time requirement.

In further embodiments, a super-activity data is superimposed on the loaner and receiver stats to merge the hosts that have mutually exclusive access time for peak workload, and wherein the command buffer pool can be leveraged in sharing mode for the hosts with non-overlapped super-activity timelines.

In certain embodiments, the loaner and receiver connections are mapped based on the mutex calculations and then the information is supplied to the connection manager, and wherein: the polling thread collects the data from the loaner receiver sides. The driver triggers the queue depth change request from the target via initiating unit attention (UA) command; and in response, if the initiator is ready to increase, decrease the queue depth, and the queue depth is changed for the connections.

In further embodiments, during DR trigger event, performing; the driver sending UA back to the initiator for revoking additional resources. the initiator understanding the situation and reducing the queue depth, and CMD buffer can be allocated to DR connections during failover.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 9:
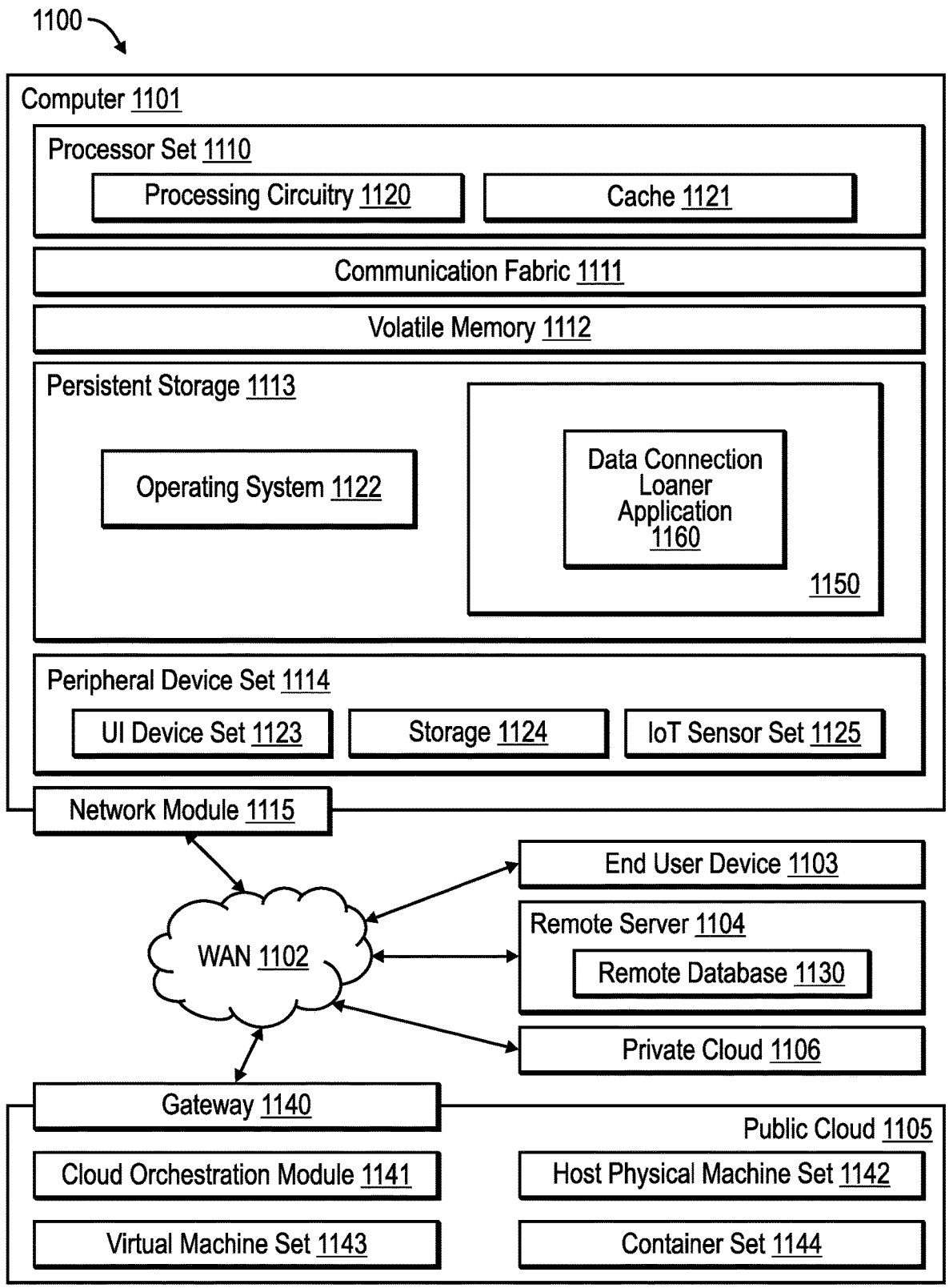
FIG. 9 illustrates a computing environment in which certain components may be implemented, in accordance with certain embodiments.

In FIG. 9, computing environment 1100 contains an example of an environment for the execution of at least some of the computer code (block 1150) involved in performing the operations of a data connection loaner application 1160 that performs operations shown in FIGS. 1-8.

In addition to block 1150, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1150, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible computer 1101 may be located in a cloud, even though it is not shown in a cloud in FIG. 8. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1150 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid-state storage devices. Operating system 1122 may take several forms, such as various known proprietary operating systems or open-source Portable Operating System Interface-type operating systems that employ a kernel. The code included in block 1150 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. I/O T sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    providing a connection management system in multi-site target system, wherein the multi-site target system is in a core or edge; and
    loaning resources for connections not needed at a point in time, from one entity to another in the connection management system, wherein:
        a storage management instance of a cloud locates hosts for site preferences and volume attachments, locates connections created from an individual site to target object identifier instances and creates a map of mutual exclusion of connections for the hosts which are on differential sites for host objects; and
        based on the map of mutual exclusion of connections for the hosts, the multi-site target system further locates connections that loan the resources to each other, wherein the method further comprises:
            initiating an initiator controller to load metadata, session information, and target details;
            loading data for session authentication and target connectivity details; and
            initializing a data structure to be used to maintain a queue depth enumerator.

2. The method of claim 1, wherein a process validates a topology for the multi-site target system for site awareness policies, and wherein:
    workload expectations are determined based on the topology; and
    the process collects data for topologies and activates connection rules accordingly.

3. The method of claim 1, wherein a target process initiates data collection from data structures about the host objects, host to volume mapped, and session count, and wherein:
    a deeper level of traversal is performed to locate sessions and connections created for every object that are created already; and
    the sessions to host to site map is generated.

4. The method of claim 1, wherein a process locates resources which are used in a mutually exclusive way, and wherein in response to a first site's hosts not using selected command buffers, the process locates hosts to which the selected command buffers are loaned to increase a session's queue depth.

5. A method, comprising:
    providing a connection management system in multi-site target system, wherein the multi-site target system is in a core or edge; and
    loaning resources for connections not needed at a point in time, from one entity to another in the connection management system, wherein:
        a storage management instance of a cloud locates hosts for site preferences and volume attachments, locates connections created from an individual site to target object identifier instances and creates a map of mutual exclusion of connections for the hosts which are on differential sites for host objects;
        based on the map of mutual exclusion of connections for the hosts, the multi-site target system further locates connections that loan the resources to each other;
        a process is initialized and loads metadata from a cluster state machine;
        the process gathers data for site information for nodes and host object policies;
        mapping of an initiator identifier and the site preferences are created and saved in a local data structure;
        a state change notification (SCN) or registered state change notification (RSCN) is polled to make changes in the local data structure and the site preferences; and
        information about volume host objects and the site preferences is in a metadata mapper class that is used to allocate queue depth.

6. A system, comprising:
    a memory; and
    a processor coupled to the memory, wherein the processor performs operations, the operations comprising:
        providing a connection management system in multi-site target system, wherein the multi-site target system is in a core or edge; and
        loaning resources for connections not needed at a point in time, from one entity to another in the connection management system, wherein:
            a storage management instance of a cloud locates hosts for site preferences and volume attachments, locates connections created from an individual site to target object identifier instances and creates a map of mutual exclusion of connections for the hosts which are on differential sites for host objects; and based on the map of mutual exclusion of connections for the hosts, the multi-site target system further locates connections that loan the resources to each other, wherein the operations further comprise:
  initiating an initiator controller to load metadata, session information, and target details;
  loading data for session authentication and target connectivity details; and
  initializing a data structure to be used to maintain a queue depth enumerator.

7. The system of claim 6, wherein a process validates a topology for the multi-site target system for site awareness policies, and wherein:
  workload expectations are determined based on the topology; and
  the process collects data for topologies and activates connection rules accordingly.

8. The system of claim 6, wherein a target process initiates data collection from data structures about the host objects, host to volume mapped, and session count, and wherein:
  a deeper level of traversal is performed to locate sessions and connections created for every object that are created already; and
  the sessions to host to site map is generated.

9. The system of claim 6, wherein a process locates resources which are used in a mutually exclusive way, and wherein in response to a first site's hosts not using selected command buffers, the process locates hosts to which the selected command buffers are loaned to increase a session's queue depth.

10. A system, comprising:
  a memory; and
  a processor coupled to the memory, wherein the processor performs operations, the operations comprising:
    providing a connection management system in multi-site target system, wherein the multi-site target system is in a core or edge; and
    loaning resources for connections not needed at a point in time, from one entity to another in the connection management system, wherein:
      a storage management instance of a cloud locates hosts for site preferences and volume attachments, locates connections created from an individual site to target object identifier instances and creates a map of mutual exclusion of connections for the hosts which are on differential sites for host objects;
      based on the map of mutual exclusion of connections for the hosts, the multi-site target system further locates connections that loan the resources to each other;
      a process is initialized and loads metadata from a cluster state machine;
      the process gathers data for site information for nodes and host object policies;
      mapping of an initiator identifier and the site preferences are created and saved in a local data structure;
      a state change notification (SCN) or registered state change notification (RSCN) is polled to make changes in the local data structure and the site preferences; and
      information about volume host objects and the site preferences is in a metadata mapper class that is used to allocate queue depth.

11. A computer program product, the computer program product comprising a computer readable storage medium having computer readable program code embodied therewith, the computer readable program code when executed is configured to perform operations, the operations comprising:
  providing a connection management system in multi-site target system, wherein the multi-site target system is in a core or edge; and
  loaning resources for connections not needed at a point in time, from one entity to another in the connection management system, wherein:
    a storage management instance of a cloud locates hosts for site preferences and volume attachments, locates connections created from an individual site to target object identifier instances and creates a map of mutual exclusion of connections for the hosts which are on differential sites for host objects; and
    based on the map of mutual exclusion of connections for the hosts, the multi-site target system further locates connections that loan the resources to each other, wherein the operations further comprise:
      initiating an initiator controller to load metadata, session information, and target details;
      loading data for session authentication and target connectivity details; and
      initializing a data structure to be used to maintain a queue depth enumerator.

12. The computer program product of claim 11, wherein a process validates a topology for the multi-site target system for site awareness policies, and wherein:
  workload expectations are determined based on the topology; and
  the process collects data for topologies and activates connection rules accordingly.

13. The computer program product of claim 11, wherein a target process initiates data collection from data structures about the host objects, host to volume mapped, and session count, and wherein:
  a deeper level of traversal is performed to locate sessions and connections created for every object that are created already; and
  the sessions to host to site map is generated.

14. A computer program product, the computer program product comprising a computer readable storage medium having computer readable program code embodied therewith, the computer readable program code when executed is configured to perform operations, the operations comprising:
  providing a connection management system in multi-site target system, wherein the multi-site target system is in a core or edge; and
  loaning resources for connections not needed at a point in time, from one entity to another in the connection management system, wherein:
    a storage management instance of a cloud locates hosts for site preferences and volume attachments, locates connections created from an individual site to target object identifier instances and creates a map of mutual exclusion of connections for the hosts which are on differential sites for host objects;
    based on the map of mutual exclusion of connections for the hosts, the multi-site target system further locates connections that loan the resources to each other;
    a process is initialized and loads metadata from a cluster state machine;
    the process gathers data for site information for nodes and host object policies;
    mapping of an initiator identifier and the site preferences are created and saved in a local data structure;
    a state change notification (SCN) or registered state change notification (RSCN) is polled to make changes in the local data structure and the site preferences; and information about volume host objects and the site preferences is in a metadata mapper class that is used to allocate queue depth.

\* \* \* \* \*